US011138830B2

(12) United States Patent
Pececnik

(10) Patent No.: US 11,138,830 B2
(45) Date of Patent: Oct. 5, 2021

(54) COMMUNAL PLAY SYSTEM WITH INDIVIDUAL STATION SECONDARY PLAY

(71) Applicant: Interblock d.d, Menges (SI)

(72) Inventor: Joze Pececnik, Kamnik (SI)

(73) Assignee: INTERBLOCK D.D., Menges (SI)

( * ) Notice: Subject to any disclaimer, the term of this patent is extended or adjusted under 35 U.S.C. 154(b) by 28 days.

(21) Appl. No.: 16/194,015

(22) Filed: Nov. 16, 2018

(65) Prior Publication Data

US 2019/0088083 A1 Mar. 21, 2019

Related U.S. Application Data

(63) Continuation of application No. 14/184,710, filed on Feb. 20, 2014, now abandoned.

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |

(52) U.S. Cl.
CPC ...... *G07F 17/3244* (2013.01); *G07F 17/3211* (2013.01)

(58) Field of Classification Search
USPC ........................ 463/1, 20, 22, 25, 39, 40, 42
See application file for complete search history.

(56) References Cited

U.S. PATENT DOCUMENTS

| | | | | |
|---|---|---|---|---|
| 4,671,632 | A * | 6/1987 | August .................. | G03B 35/00 352/58 |
| 6,685,567 | B2 | 2/2004 | Cockerille et al. | |
| 8,177,368 | B2 | 5/2012 | O'Connell et al. | |
| 8,292,739 | B2 | 10/2012 | Iverson et al. | |
| 8,403,740 | B2 | 3/2013 | Kovacs et al. | |
| 8,414,372 | B2 | 4/2013 | Cannon et al. | |
| 8,425,306 | B2 | 4/2013 | Low | |
| 8,512,120 | B2 | 8/2013 | Nelson et al. | |
| 8,734,260 | B2 | 5/2014 | Pececnik | |
| 9,916,717 | B2 | 3/2018 | Pececnik | |
| 2005/0054428 | A1 | 3/2005 | Nordman et al. | |

(Continued)

FOREIGN PATENT DOCUMENTS

WO WO 2013/043369 A1 3/2013

OTHER PUBLICATIONS

Schaufler et al.; "A Three Dimensional Image Cache for Virtual Reality"; Computer Graphics Forum; vol. 15 Issue 3; Aug. 1996; 11 pages.

*Primary Examiner* — Adetokunbo O Torimiro
(74) *Attorney, Agent, or Firm* — BakerHostetler

(57) ABSTRACT

A gaming system and method where at least two player terminals, each including a seat, a display, inputs/outputs, a reader system, and an electro-mechanical component that provides a first gaming event unique to the terminal on which wagers can be placed and resolved based on a random event outcome. The system and method also includes a communal gaming system connected to terminals and including a processor and memory for storing code that executes a second gaming event that is common to each terminal and displayed on a display visible to each player of the terminals. The first gaming events are carried out on the terminals during or between each second gaming event.

16 Claims, 6 Drawing Sheets

(56) References Cited

U.S. PATENT DOCUMENTS

| | | | | |
|---|---|---|---|---|
| 2009/0109175 | A1 | 4/2009 | Fein et al. | |
| 2012/0122564 | A1* | 5/2012 | Kovacs | G07F 17/3211 463/25 |
| 2013/0157754 | A1 | 6/2013 | Kovacs et al. | |

* cited by examiner

COMMUNAL PLAY SYSTEM WITH INDIVIDUAL STATION SECONDARY PLAY

CROSS REFERENCE TO RELATED APPLICATIONS

This application is a continuation of U.S. patent application Ser. No. 14/184,710, filed Feb. 20, 2014, the contents of which is incorporated herein by reference in its entirety.

BACKGROUND OF THE INVENTION

Field of the Invention

The present technology relates to the field of gaming apparatus and gaming methods, particularly gaming apparatus and methods used in a communal or community play environment.

Background of the Art

In the casino and gaming industries, there are a number of principles that guide revenue performance. The more people placing wagers at a faster pace for longer periods of time in games with significant house retention of total wagers increases revenues. These issues are in conflict with an increasing demand by players to have more entertainment time during play without reducing the general frequency and size of winning events.

One way of reducing capital expenditures, controlling speed of play and providing entertainment value to players in a gaming environment is to provide communal games, arena settings, community games and/or theater settings with electronic gaming systems. The only moderating factor in these systems as excellent revenue producers is the fact that pace of play is usually structured to keep the slower players comfortable at the gaming environment. If a significant number of players feel harried by sort intervals between games, they may leave the gaming system. This is contrary to the objective of keeping players in the gaming environment for the longest periods of time.

Applicant has recently introduced novel gaming technology in the form of high quality holographic systems disclosed in copending U.S. patent application Ser. No. 13/631,195, filed Sep. 28, 2013 and Ser. No. 13/915,902, filed Jun. 12, 2013 which disclose holographic system in an arena environment or on a track between multiple stages. These are communal systems with individual wagering terminals for each player.

Some individual, stand-alone terminals have incorporated multiple games that can be played by a single player simultaneously, in sequence or alternatively.

U.S. Pat. No. 8,292,739 enables a system for dynamically changing the graphical content on slot machine reel is disclosed herein. The system includes reel displays and data transmission techniques which provide for dynamically updating or changing the graphics on the reel displays in a slot machine. In one system for dynamically changing graphical reel content, new image content is placed on the reel displays at any time, even while the reel displays are spinning. The system may even be used to give the appearance of rotation to a stationary reel display.

Published PCT Application No. WO 2013043369 enables a gaming system, gaming device, and method providing multiple simultaneously playable wagering games with individual credit balances. The gaming system: simultaneously displays a plurality of wagering games, each having a separate credit meter; simultaneously displays the credit meters of the wagering games; and enables a player to transfer credits from the credit meter of one wagering game to the credit meter of another wagering game. For each wagering game, the gaming system displays a total number of credits in the credit meter of that wagering game. The total number of credits includes a first sum of: any credits deposited into that credit meter, any credits won during play of that wagering game, and any credits transferred into that credit meter less a second sum of: any credits wagered during play of that wagering game, any credits transferred from that credit meter, and any credits cashed out of that credit meter.

Published U.S. Patent Application Document No. 20130157754 and U.S. Pat. No. 8,403,740 provide a gaming system including a central controller, a central display which includes a plurality of display segments and a plurality player stations. The display segments are configured to each separately display one of a plurality of games, to co-act to display a plurality of games, or to co-act to display one game. Each player station is configured to enable a player to play one or more of the games displayed by the display segments, The gaming system enables a plurality of players to play a group game on the central display, a plurality of players to simultaneously play multiple group games on the central display, and a plurality of players to each simultaneously play multiple individual games on the central display.

U.S. Pat. No. 8,512,120 provides a gaming system, gaming device, and method providing multiple simultaneously playable wagering games with individual credit balances. The gaming system: simultaneously displays a plurality of wagering games, each having a separate credit meter; simultaneously displays the credit meters of the wagering games; and enables a player to transfer credits from the credit meter of one wagering game to the credit meter of another wagering game. For each wagering game, the gaming system displays a total number of credits in the credit meter of that wagering game. The total number of credits includes a first sum of: any credits deposited into that credit meter, any credits won during play of that wagering game, and any credits transferred into that credit meter less a second sum of: any credits wagered during play of that wagering game, any credits transferred from that credit meter, and any credits cashed out of that credit meter.

U.S. Pat. No. 8,414,372 provides gaming apparatus and methods for conducting a wagering game of chance. A gaming machine is disclosed which is configured for mutually concurrent play of a plurality of games of chance on a single display screen. A method of conducting a wagering activity includes providing a player with a plurality of differing games of chance, at least some of which are mutually concurrently playable on a single screen display of a gaming device and enabling mutually concurrent play of the plurality of differing games of chance on the single screen display. Various other gaming machine configurations and methods of play related to multiple differing games of chance on a single display screen are also disclosed herein. Networked gaming machines are also disclosed.

U.S. Pat. No. 8,425,306 provides a gaming device having at least one target reel having target values, a plurality of value reels each having accumulative values, and a processor programmed to cause a spin of the target reel and value reels, accumulate the accumulative values generated on the value reels to form a cumulative value, compare the cumulative value to a designated one of the generated target values on the target reel, and provide an award to a player if the cumulative value meets a predefined mathematical threshold with respect to the designated one of the target values.

Further advancement in gaming technology is still needed.

All references cited herein are incorporated by reference in their entirety.

SUMMARY OF THE INVENTION

A communal gaming system and method has a processor, a central display area for displaying a common wagering event on a communal display facility and at least two individual player wagering terminals configured to enable wagering on the common wagering event. The at least two individual wagering terminals each have individual mechanical components providing individual gaming events and input controls for those individual gaming events. The communal game and the game provided by the individual mechanical components are preferably related to totally different underlying games.

DETAILED DESCRIPTION OF THE INVENTION

Figure 1:
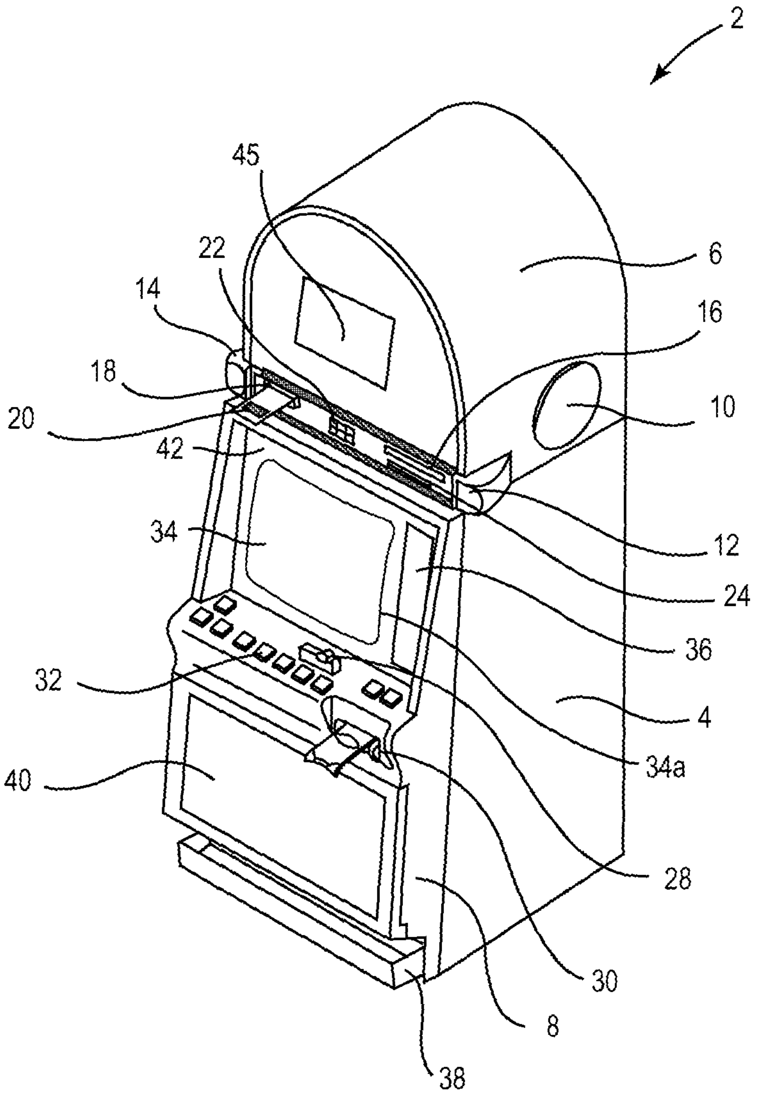
FIG. 1 shows an individual wagering terminal according to the present technology.

The present technology includes both apparatus and process technology. An underlying aspect of the technology is that individual players often like to play at different speeds or have shorter attention spans and do not want to wait on the actions of others to control speed of play. In the present technology, individual secondary game play is provided during intervals of communal game play to allow each individual the ability to fill time between instances of the communal game play.

A communal gaming system will typically have a processor, a central display area for displaying a common wagering event on a communal display facility and at least two individual player wagering terminals configured to enable wagering on the common wagering event. These terminals typically may or may not have significant processing power as they are basically communication systems or input systems to the processor which is a central processor, a single processor controlling and executing and resolving the communal game for wagers placed from each of the at least two individual player wagering terminals. An aspect of the present technology is that, in addition to the functional ability to place, communicate and receive information on the communal wager, the at least two individual wagering terminals each have individual electronic and/or mechanical components providing individual gaming events and input controls for those individual gaming events. In the intervals between communal game play, and even during communal game play and resolutions, the individual player terminal may engage the player in individual, local, personal game play on the electrical, electromechanical and/or mechanical gaming subsystem. The at least two individual player terminals may have the same or preferably different secondary games. This allows individual players to select specific secondary games that they enjoy, for example, from among dice games (craps, Yahtzee™ games, etc.), roulette, mini-roulette games, candy wheels, playing card games, tile games and the like. Where these secondary games are mechanical games, with moveable elements, the game pieces should be restrained by a covering and enclosing element (which can be transparent, translucent or otherwise viewed through) such as a cage, bubble, box, container, cylinder and the like.

The communal game and the game provided by the individual mechanical components are preferably related to totally different underlying games. For example, the electronic game may be video poker, reel-type payline gaming systems, keno, bingo, playing card games (e.g., blackjack, poker variants, baccarat, etc.), and match games and the like, while the mechanical components may be physical dice games (craps, Yahtzee™ games, etc.), ball drop-and-capture events (e.g., roulette), (pin and pointer games (e.g., candy wheel, Big 6™ games), tile games and the like.

The communal system may provide the commonly displayed and/or commonly viewed gaming system on an at least on display facility comprises at least one flat screen, a three-dimensional display, a holographic display stage, an extra-large (at least 50% larger than the individual player terminal displays, as in a Jumbo Candy Wheel, jumbo reel-slot system, horse race display, jumbo dice or the like) communal system and the like.

In one embodiment, at least one of the individual systems comprises an individual mechanical wagering event providing a wagering outcome for the individual system. The individual mechanical wagering event will be controlled by a local processor (separate from the communal system processor), such as a dedicated processor in the individual player wagering terminal, or a separate processor (from the communal system processor) that engages and controls the secondary game play for one or more or all of the secondary games.

The system may have the individual mechanical event as an enclosed mechanical dice casting system, an enclosed mechanical spinning wheel and ball drop and catch system, an enclosed mechanical spinning wheel and pointer system, an enclosed mechanical reel slot system, or electronic wagering outcome for the individual system.

The system provides at least one of the individual systems as an individual mechanical wagering event providing a wagering outcome for the individual system. The system may have the individual mechanical event selected from the group consisting of an enclosed mechanical dice casting system, an enclosed mechanical spinning wheel and ball drop and catch system, an enclosed mechanical spinning wheel and pointer system and an enclosed mechanical reel slot system.

Turning next to FIG. 1, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine.

Attached to the main door are player-input switches or buttons 32, a coin acceptor 28, and a bill validator 30, a coin tray 38, and a display area including a mechanical gaming system (or less preferably a separate electronic game) 40. There may be an overlay of touchscreen functionality on the separate electronic game 40 or some of the buttons 32 may be functional on the separate mechanical gaming system 40. That separate mechanical gaming system may be in a relatively vertical viewing position as shown or in a more horizontal (table like) display unit Viewable through the main door is a video display monitor 34 and an information panel 36. The display monitor 34 will typically be a cathode ray tube, high resolution flat-panel LCD, LED, plasma screen or other conventional electronically controlled video monitor. The information panel 36 may be a back-lit, silk screened glass panel with lettering to indicate general game information including, for example, a game denomination (e.g., $0.25 or $1). The bill validator 30, player-input switches 32, video display monitor 34, and information panel are devices used to play a game on the game machine 2. The devices are controlled by circuitry (e.g. the master gaming controller) housed inside the main cabinet 4 of the machine 2.

Many different types of games, including mechanical slot games, video slot games, video poker, video blackjack, video pachinko and lottery, may be provided with gaming machines of this invention, In particular, the gaming machine 2 may be operable to provide a play of many different instances of games of chance. The instances may be differentiated according to themes, sounds, graphics, type of game (e.g., slot game vs, card game), denomination, number of paylines, maximum jackpot, progressive or non-progressive, bonus games, etc, The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may executed game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information. a florescent display 16 for displaying player tracking information, a card reader 24 for entering a magnetic striped card containing player tracking information, and a video display screen 42. The ticket printer 18 may be used to print tickets for a cashless ticketing system. Further, the top box 6 may house different or additional devices than shown in the FIG. 1. For example, the top box may contain a bonus wheel or a back-lit silk screened panel which may be used to add bonus features to the game being played on the gaming machine. As another example, the top box may contain a display for a progressive jackpot offered on the gaming machine. During a game, these devices are controlled and powered, in part, by circuitry (e.g. a master gaming controller) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in or on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may he displayed on portable gaming devices that are used to play a game of chance. Further a gaming machine or server may include gaming logic for commanding a remote gaming device to render an image from a virtual camera in 3-D gaming environments stored on the remote gaming device and to display the rendered image on a display located on the remote gaming device. Thus, those of skill in the art will understand that the present invention, as described below, can be deployed on most any gaming machine now available or hereafter developed.

Some preferred gaming machines are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory, The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine, This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of some preferred circuits is that the operating software cannot completely disable the function of the watchdog timer. In other words, the watchdog timer always functions from the time power is applied to the computer board.

Gaming computer platforms preferably use several power supply voltages to operate portions of the computer circuitry. These can be generated in a central power supply or locally on the computer board. If any of these voltages fall out of the tolerance limits of the circuitry they power, unpredictable operation of the computer may result. Though most modem general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry, In addition, the voltage monitoring circuitry implemented in gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for slot machine game software is to use a state machine, Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc. that occurred just prior to the malfunction, After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device, The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion.

Another feature of gaming machines, such as gaming computers, is that they often contain unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, Netplex™ system of IGT is a proprietary communication protocol used for serial communication between gaming devices. As another example, SAS is a communication protocol used to transmit information, such as metering information, from a gaming machine to a remote device. Often SAS is used in conjunction with a player tracking system.

Gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into a gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in a gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 which is incorporated herein in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could he provided by software, gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 1, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 42 located in the top box.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights 1 within the separate mechanical (or electronic) separately, individually wagerable gaming system 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

Figure 1A:
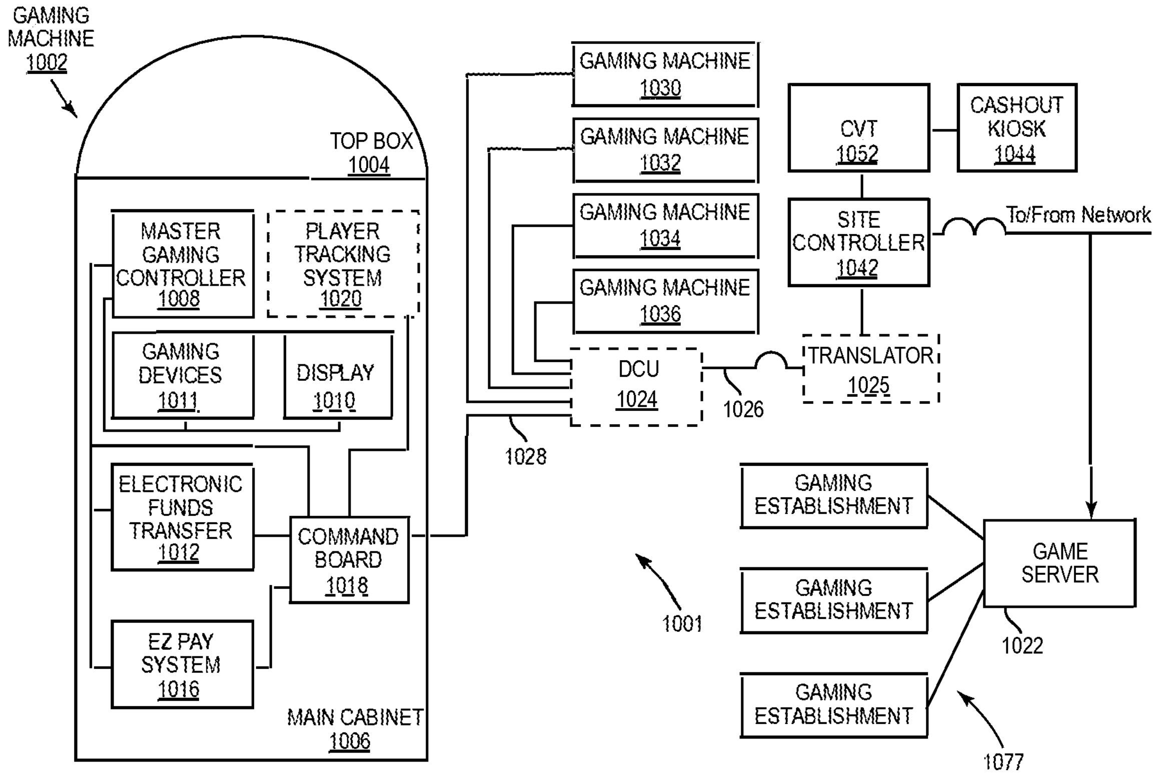
FIG. 1A shows a schematic of a gaming system that may be incorporated into play of the present technology.

Another gaming network that may be used to implement some aspects of the invention is depicted in FIG. 1A Gaming establishment 1001 could be any sort of gaming establishment, such as a casino, a card room, an airport, a store, etc. In this example, gaming network 1077 includes more than one gaming establishment, all of which are networked to game server 1022. Here, gaming machine 1002, and the other gaming machines 1030, 1032, 1034, and 1036, include a main cabinet 1006 and a top box 1004. The main cabinet 1006 houses the main gaming elements and can also house peripheral systems, such as those that utilize dedicated gaming networks. The top box 1004 may also be used to house these peripheral systems.

The master gaming controller 1008 controls the game play on the gaming machine 1002 according to instructions and/or game data from game server 1022 or stored within gaming machine 1002 and receives or sends data to various input/output devices 1011 on the gaming machine 1002. In one embodiment, master gaming controller 1008 includes processor(s) and other apparatus of the gaming machines described above in FIGS. 6 and 7. The master gaming controller 1008 may also communicate with a display 1010.

A particular gaming entity may desire to provide network gaming services that provide some operational advantage. Thus, dedicated networks may connect gaming machines to host servers that track the performance of gaming machines under the control of the entity, such as for accounting management, electronic fund transfers (EFTs), cashless ticketing, such as EZPay™, marketing management, and data tracking, such as player tracking. Therefore, master gaming controller 1008 may also communicate with EFT system 1012, EZPay™ system 1016 (a proprietary cashless ticketing system of the present assignee), and player tracking system 1020. The systems of the gaming machine 1002 communicate the data onto the network 1022 via a communication board 1018.

It will be appreciated by those of skill in the art that embodiments of the present invention could be implemented on a network with more or fewer elements than are depicted in FIG. 1A. For example, player tracking system 1020 is not a necessary feature of some implementations of the present invention. However, player tracking programs may help to sustain a game player's interest in additional game play during a visit to a gaming establishment and may entice a player to visit a gaming establishment to partake in various gaming activities. Player tracking programs provide rewards to players that typically correspond to the player's level of patronage (e.g., to the player's playing frequency and/or total amount of game plays at a given casino). Player tracking rewards may be free meals, free lodging and/or free entertainment. Player tracking information may be combined with other information that is now readily obtainable by an SBG system.

Moreover, DCU 1024 and translator 1025 are not required for all gaming establishments 1001. However, due to the sensitive nature of much of the information on a gaming network (e.g., electronic fund transfers and player tracking data) the manufacturer of a host system usually employs a particular networking language having proprietary protocols. For instance, 10-20 different companies produce player tracking host systems where each host system may use different protocols. These proprietary protocols are usually considered highly confidential and not released publicly.

Further, gaming machines are made by many different manufacturers. The communication protocols on the gaming machine are typically hard-wired into the gaming machine and each gaming machine manufacturer may utilize a different proprietary communication protocol. A gaming machine manufacturer may also produce host systems, in which case their gaming machines are compatible with their own host systems. However, in a heterogeneous gaming environment, gaming machines from different manufacturers, each with its own communication protocol, may be connected to host systems from other manufacturers, each with another communication protocol. Therefore, communication compatibility issues regarding the protocols used by the gaming machines in the system and protocols used by the host systems must be considered.

A network device that links a gaming establishment with another gaming establishment and/or a central system will sometimes be referred to herein as a "site controller." Here, site controller 1042 provides this function for gaming establishment 1001. Site controller 1042 is connected to a central system and/or other gaming establishments via one or more networks, which may be public or private networks. Among other things, site controller 1042 communicates with game server 1022 to obtain game data, such as ball drop data, bingo card data, etc.

In the present illustration, gaming machines 1002, 1030, 1032, 1034 and 1036 are connected to a dedicated gaming network 1022. In general, the DCU 1024 functions as an intermediary between the different gaming machines on the network 1022 and the site controller 1042. In general, the DCU 1024 receives data transmitted from the gaming machines and sends the data to the site controller 1042 over a transmission path 1026. In some instances, when the hardware interface used by the gaming machine is not compatible with site controller 1042, a translator 1025 may be used to convert serial data from the DCU 1024 to a format accepted by site controller 1042. The translator may provide this conversion service to a plurality of DCUs.

Further, in some dedicated gaming networks, the DCU 1024 can receive data transmitted from site controller 1042 for communication to the gaming machines on the gaming network. The received data may be, for example, communicated synchronously to the gaming machines on the gaming network.

Here, CVT 1052 provides cashless and cashout gaming services to the gaming machines in gaming establishment 1001. Broadly speaking, CVT 1052 authorizes and validates cashless gaming machine instruments (also referred to herein as "tickets" or "vouchers"), including but not limited to tickets for causing a gaming machine to display a game result and cash-out tickets. Moreover, CVT 1052 authorizes the exchange of a cashout ticket for cash. These processes will be described in detail below. In one example, when a player attempts to redeem a cash-out ticket for cash at cashout kiosk 1044, cash out kiosk 1044 reads validation data from the cashout ticket and transmits the validation data to CVT 1052 for validation. The tickets may be printed by gaming machines, by cashout kiosk 1044, by a stand-alone printer, by CVT 1052, etc. Some gaming establishments will not have a cashout kiosk 1044. Instead, a cashout ticket could be redeemed for cash by a cashier (e.g. of a convenience store), by a gaming machine or by a specially configured CVT.

Figure 1B:
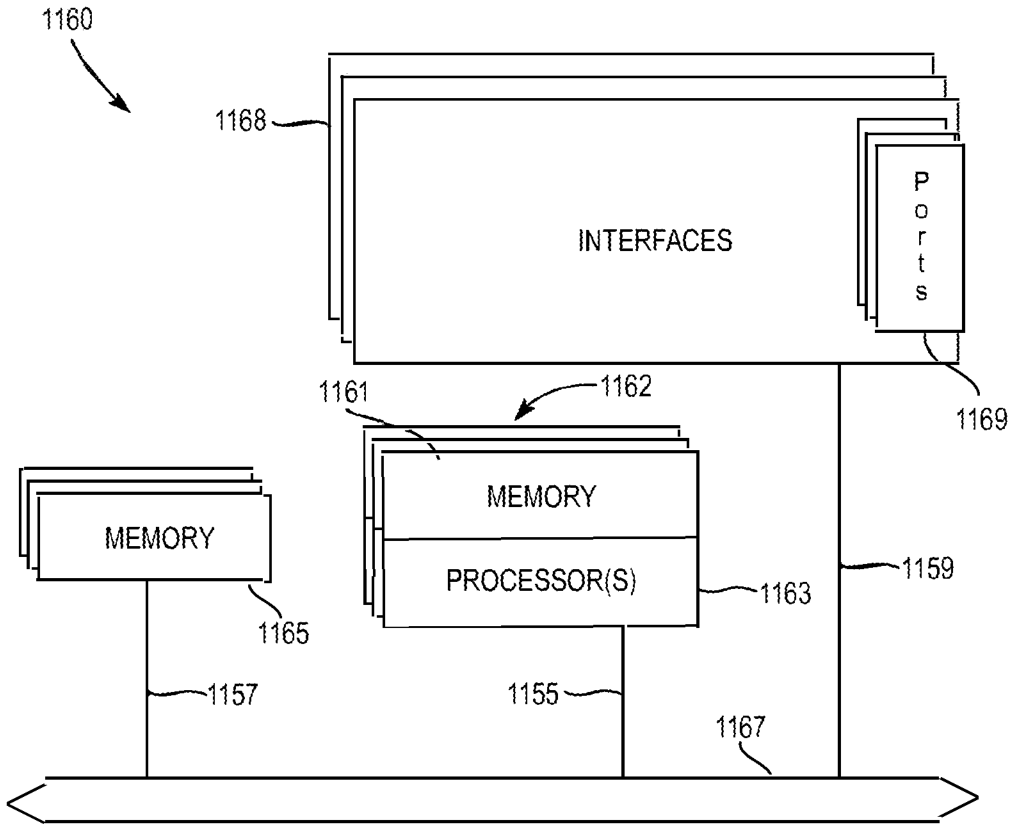
FIG. 1B shows a schematic of a terminal useful in the practice of the present technology.

FIG. 1B illustrates an example of a network device that may be configured for implementing some methods of the present invention. Network device 1160 includes a master central processing unit (CPU) 1162, interfaces 1168, and a bus 1167 (e.g., a PCI bus). Generally, interfaces 1168 include ports 1169 appropriate for communication with the appropriate media. In some embodiments, one or more of interfaces 1168 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 1168 control such communications-intensive tasks as encryption, decryption, compression, decompression, packetization, media control and management. By providing separate processors for the communications-intensive tasks, interfaces 1168 allow the master microprocessor 1162 efficiently to perform other functions such as routing computations, network diagnostics, security functions, etc.

The interfaces 1168 are typically provided as interface cards (sometimes referred to as "linecards"). Generally, interfaces 1168 control the sending and receiving of data packets over the network and sometimes support other peripherals used with the network device 1160. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1162 may be responsible for implementing specific functions associated with the functions of a desired network device. According to some embodiments, CPU 1162 accomplishes all these functions under the control of software including an operating system and any appropriate applications software.

CPU 1162 may include one or more processors 1163 such as a processor from the Motorola family of microprocessors or the MIPS family of microprocessors. In an alternative embodiment, processor 1163 is specially designed hardware for controlling the operations of network device 1160. In a specific embodiment, a memory 1161 (such as non-volatile RAM and/or ROM) also forms part of CPU 1162. However, there are many different ways in which memory could be coupled to the system. Memory block 1161 may be used for a variety of purposes such as, for example, caching and/or storing data, programming instructions, etc.

Regardless of network device's configuration, it may employ one or more memories or memory modules (such as, for example, memory block 1165) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 1B illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 1B) or switch fabric based (such as a cross-bar).

While this invention is described in terms of preferred embodiments, there are alterations, permutations, and equivalents that fall within the scope of the invention. It should also be noted that there are many alternative ways of implementing the present invention. It is therefore intended that the invention not be limited to the preferred embodiments described herein, but instead that the invention should be interpreted as including all such alterations, permutations, and equivalents as fall within the true spirit and scope of the present invention.

An example of an underlying holographic communal wagering theatre is disclosed in copending U.S. patent application Ser. No. 13/631,195, filed Sep. 28, 2012 which is incorporated herein by reference and discloses a gaming system that provides a wagering venue for multiple wagering positions and a three-dimensional or holographic display of game events. The basic equipment desirable for performing the process and forming the system may include:

a. a processor configured to execute code to simulate a physical random gaming event outcome using a random number generator. A commercially available gaming processor or central processor may be used. The processor may be provided with memory, flash memory, EPROM, EEPROM, RAM, ROM, input/output ports, hard-wire or wireless communication enabling capability and the like.

b. memory storing three-dimensional video displayable image data of a device useful in providing the physical random gaming event outcome. The displayable image data may be segmented or may be in a continuous format. In segmented format, a first generic image data set would display a generic movement of the virtual random event generations system would be shown. For example, a first generic segment of a spinning roulette wheel with revolving ball around the edge may be shown, bouncing dice, spinning candy wheel, cards being dealt face down, and the like can be show. An individual, specific segment may be transferred from memory to the three-dimensional display system at the end of the generic segment. The individual, specific display data segment would then show the virtual image of the random number generated determined outcome for the game event. This method reduces the total amount of data that must be stored in displaying outcomes. This is particularly important where a single processor stores multiple games thereon.

c. a three-dimensional video display system having a three-dimensional image display field viewable within an at least 30 degree field of view. The field of view may be larger to accommodate more displays. Depending upon the size of the display, the nature of the display system, its inherent or modifiable available angle of vision and the number and position of player input terminals, the field of view may be required to be up to 180 degrees or 360 degrees. It is also possible for multiple display systems to be arranged to expand the functional field of view available from a single component system.

d. at least two player input terminals and seating for the player input terminals within the at least 30 degree field of view;

wherein the processor is configured i) to identify a wager from a specific player input terminal, ii) to initiate generation of an event outcome in a random event outcome game, iii) to generate an event outcome simulating a physical random event generating outcome; iv) to select image data from the memory of a three-dimensional event outcome in which the generated simulated physical random event outcome is shown; v) displaying the selected image data; and resolving the wager based upon the generated event outcome.

The three-dimensional imaging system may include a separate computer/processor or additional capacity in the underlying computer for the system. In computers, 3-D (three dimensions or three-dimensional) describes an image that provides the perception of depth. When 3-D images are made interactive so that users feel involved with the scene, the experience is called virtual reality. In a personal computer system, the user usually needs a special plug-in viewer for the Web browser to view and interact with 3-D images. Virtual reality experiences may also require additional equipment.

3-D image creation can be viewed as a three-phase process of: tessellation, geometry, and rendering. In the first phase, models are created of individual objects using linked points that are made into a number of individual polygons (tiles). In the next stage, the polygons are transformed in various ways and lighting effects are applied. In the third stage, the transformed images are rendered into objects with very fine detail. Popular products for creating 3-D effects include Extreme 3D, LightWave 3D, Ray Dream Studio, 3D Studio MAX, Softimage 3D, and Visual Reality. The Virtual Reality Modeling Language (VRML) allows the creator to specify images and the rules for their display and interaction using textual language statements.

High speed display of three-dimensional images from caches of memory are enabled by techniques such as those of (http://www.cs.princeton.edu/courses/archive/spr01/cs598b/papers/schaufler96.pdf), A Three Dimensional Image Cache for Virtual Reality, Gernot Schaufler and Wolfgang Stürzlinger, GUP, Johannes Kepler Universität Linz, Altenbergerstr.69, A-4040 Linz, Austria/Europe.

A particular imaging system within the scope of the present technology includes a gaming system for providing a wagering venue for multiple wagering positions. The system may have:

a. a processor configured to execute code to simulate a physical random gaming event outcome using a random number generator;

b. memory storing three-dimensional video displayable image data of a device useful in providing the physical random gaming event outcome;

c. a three-dimensional video display system having a three-dimensional image display field viewable within an at least 30 degree field of view;

d. at least two player input terminals and seating for the player input terminals within the at least 30 degree field of view;

wherein the processor is configured i) to identify a wager from a specific player input terminal, ii) to initiate generation of an event outcome in a random event outcome game, iii) to generate an event outcome simulating a physical random event generating outcome; iv) to select image data from the memory of a three-dimensional event outcome in which the generated simulated physical random event outcome is shown; v) to display the selected image data; and vi) to resolve the wager based upon the generated event outcome;

wherein the three-dimensional image display system comprises an image display apparatus, comprising: an image source, a mount, an at least partially transparent screen, and a pigmented reflective member, the mount being arranged to retain the screen under tension, such that the screen is inclined at an angle with respect to a plane of emission of light from the image source; the screen having a front surface arranged such that light emitted from the image source is reflected therefrom; and the image source being arranged to provide an image such that light forming the image impinges upon the screen such that a virtual image is created from light reflected from the screen, the virtual image appearing to be located behind the screen, the apparatus further comprising a stage, and a stage background, the screen being provided in front of the stage, wherein a plurality of light sources are arranged to illuminate at least part of at least one of the stage or stage background, and the pigmented reflective member being provided in an optical pathway between the image source and the screen and being operative to reflect only light from part of the visible spectrum such that the pigmented reflective member reduces a milky hue associated with light where there is no image to be presented surrounding a Pepper's Ghost image to compensate for variations in levels of unwanted light hitting the surface of the screen; wherein an angle of inclination of the pigmented reflective member with respect to the plane of emission of light from the image source is variable.

The gaming system may have at least two of the player input terminals comprise free-standing individual gaming terminals with player input controls or at least two banked gaming terminals and at least one of the player input terminals may comprise a portable handheld device in wireless communication with the processor. There may be multiple rows of multiple player input controls within the 30 degree field of view, creating an arena or amphitheater setting.

The processor may be configured with software in memory to execute game rules of at least two different games selected from the group consisting of roulette, bingo, dice games, playing card games and spinning wheel games. The processor may be configured with software in memory to execute game rules of at least two different games selected from the group consisting of roulette, bingo, dice games, playing card games and spinning wheel games. The processor may be configured with software in memory to execute game rules of at least two different games selected from the group consisting of roulette, bingo, dice games, playing card games and spinning wheel games. The processor may be configured with software in memory to execute game rules of at least roulette and to display on the three-dimensional display system three-dimensional images of a) a virtual spinning roulette wheel with spinning virtual roulette ball or b) a virtual roulette ball moving about the rim of a stationary roulette wheel.

Each wagering environment, which may be a casino or an amphitheater within a casino may include a local area network, which may include an access point from a central server/processor (which may service the single wagering environment or multiple wagering environments), a wagering game server, and the individual player input wagering game systems or terminals. The access point (the I/O connection at the individual wagering environment to the main server/processor) preferably provides wireless communication links, although wired communication links may also be used. The wired and wireless communication links can employ any suitable connection technology, such as Bluetooth, 802.11, Ethernet, public switched telephone networks, SONET, etc. In some embodiments, the wagering game server can serve wagering games and distribute content to devices located in other casinos or at other locations on the communications network.

There may be a content server, game server or central gaming processor that comprises a wagering game three-dimensional animations/image database, an object movement result generator, and a compositing unit. The compositing unit would be coupled with the object movement result generator and with the wagering game animations database. The compositing unit selects one of multiple pre-generated and stored wagering game animations (e.g., dice throw animations, roulette spins, wheel spins, cards dealt, etc.) from the wagering game animations database responsive to initiation of play after wagers have been accepted, so as to present a wagering game animation. The object movement result generator determines an outcome of a wagering game that involves object movement (e.g., a dice throw) and an orientation of the object(s) to be presented by the display stage central to the gaming system. The outcome is randomly determined (e.g., by a random number generator), the final orientation of the object(s) in displaying the event outcome must represent the specifically determined random event outcome. For example, a pre-determined three-dimensional image indicating the dice being randomized (e.g., shaken in a virtual container or in a virtual hand) is provided (e.g., as the generic segment of the display) and then the final orientation of dice for a given outcome of a dice throw is displayed as the final segment. The compositing unit determines, based on the random number generated outcome of the dice throw and the orientation of the dice, a final image display position of the virtual three-dimensional display of the dice. The compositing unit also may constrain the virtual image of the dice in throw animation based on knowledge of the initial state of the virtual dice (which the system may allow an individual player among the multiple players to set the virtual dice as the shooter) to assist in generating the virtual dice throw graphics. The three-dimensional segment or continuous image content server then provides the virtual dice throw graphics to the wagering game machine. It is noted that in some implementations, the content server may comprise a simulation unit that simulates object movement for wagering games subject to parameters that correspond to the object (e.g., a dice throw subject to dice throw parameters and laws of physics to generate the dice throw animation). In other implementations, the wagering game animations may be generated on another server and may be uploaded to the content server.

Embodiments are not limited to implementing functionality of the compositing unit within the content. The content server can select the dice throw animation and can determine the outcome of the dice throw and the orientation of the dice, while the wagering game machine can determine the initial state of the dice and can appropriately constrain the dice to the dice throw animation to generate the dice throw graphics. The wagering game machines described herein can take any suitable form, such as floor standing models, handheld mobile units, table top models, workstation-type console models, etc. Further, the wagering game machines can be primarily dedicated for use in conducting wagering games, or can include non-dedicated devices, such as mobile phones, personal digital assistants, personal computers, etc. In one embodiment, the wagering game network can include other network devices, such as accounting servers, wide area progressive servers, player tracking servers, and/or other devices suitable for use in connection with embodiments of the invention.

In some embodiments, wagering game machines and wagering game servers work together such that a wagering game machine can be operated as a thin, thick, or intermediate client. For example, one or more elements of game play may be controlled by the wagering game machine (client) or the wagering game server (server). Game play elements can include executable game code, lookup tables, configuration files, game outcomes, audio or visual representations of the game, game assets, or the like. In a thin-client example, the wagering game server 506 can perform functions such as determining game outcome or managing assets, while the wagering game machine can present a graphical representation of such outcome or asset modification to the user (e.g., player). In a thick-client example, the wagering game machines can determine game outcomes and communicate the outcomes to the wagering game server for recording or managing a player's account.

In some embodiments, either the wagering game machines (client) or the wagering game server can provide functionality that is not directly related to game play. For example, account transactions and amount rules may be managed centrally (e.g., by the wagering game server) or locally (e.g., by the wagering game machine 502). Other functionality not directly related to game play may include power management, presentation of advertising, software or firmware updates, system quality or security checks, etc.

Any of the wagering game network components (e.g., the wagering game machines) can include hardware and machine-readable media including instructions for performing the operations described herein.

Amphitheater Design

Figure 2:
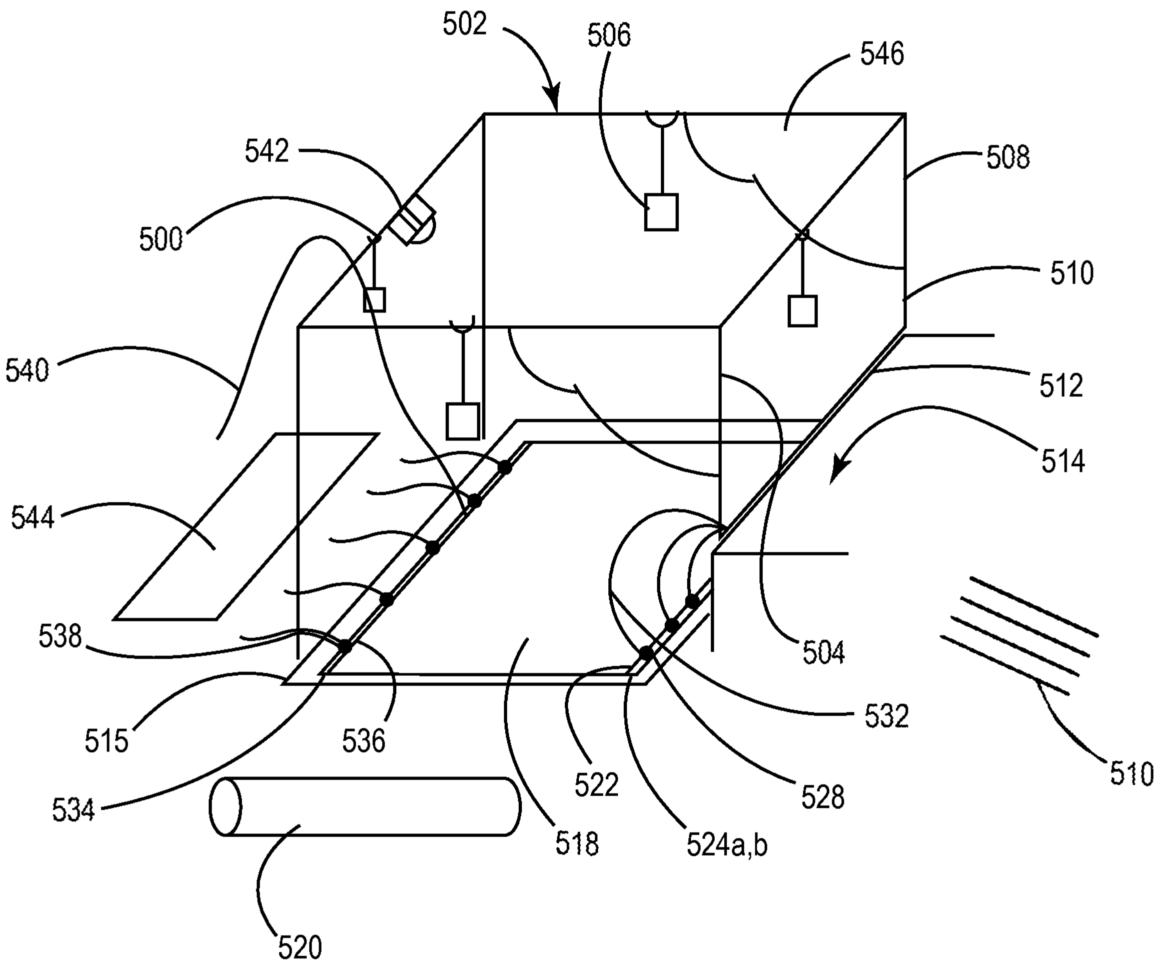
FIG. 2 is a schematic view of a projection apparatus according to the teachings of the Prior Art represented by U.S. Pat. No. 8,177,368.

Referring now to FIG. 2, which displays a 3D Holographic amphitheater according to U.S. Pat. No. 8,177,368 a box truss framework 500 comprises a square upper truss work 502 and leg trusses 504. In constructing the framework 500 the upper truss work 502 rests upon a number of jacks 506. First sections 508 of the leg trusses 504 that extend at right angles to the upper truss work 502 are added at the comers of the upper truss work 502. The height of the jacks 506 is increased to allow additional sections 510 of the leg trusses 504 to be added until the desired height of the box truss framework 500 is achieved.

A cross-piece truss 512 is fixed to two of the leg trusses 504 such that it horizontally spans the gap therebetween at a height close to and typically slightly below, the level of a stage floor 514. The leg trusses 504 spanned by the cross-piece truss 512 constitute the rear legs of the framework 500 and are located adjacent the front of the stage floor 514.

A dust-free protective plastic sheet 515 is laid across the width of the stage floor 514 in front of the rear legs of the framework 500. A roll of screen film 518 is removed from a protective cylindrical casing 520 and is unwound across the width of the stage floor 514. The film 518 is placed upon the sheet 515 in order to prevent damage to the surface from dust particles or other sharp protrusions.

A lower edge 522 of the film 518 is placed between jaws 524*a, b* of a retention member 526, each jaw 524*a, b* having opposed openings therethrough spaced at approximately 0.5 m intervals. Bolts 528 are placed through the openings, and through the film 518, and secured in position using respective nuts. Ratchet straps 532 are attached to the retention member 526 adjacent alternate bolts 528, having a spacing of approximately 1 m, and are then attached to the cross-piece truss 512.

A second retention member 534 is attached to an upper edge 536 of the film 518 in a similar manner to how the retention member 526 is attached to the lower edge 522. Ratchet straps 538 are attached to the second retention member 534.

A rope 540 is tied to the second retention member 534 and is passed over the upper truss work 502 opposite the cross-piece truss 512. The film is raised into position using the rope 540 and the ratchet straps 538 are attached to the upper truss work 502. Both sets of ratchet straps 532, 538 are tightened individually until the screen film is tensioned such that the film 518 is flat and, ideally, free from wrinkles.

A projector 542 is depended from the upper truss work 502 and a pigmented reflective board 544 is placed between the screen 518 and the front edge of the box truss framework 500 such that light emitted by the projector 542 is reflected from the board 544 onto the screen 518. The screen 518 reflects at least part of the light from a front surface thereof away from the stage and into an auditorium to be viewed by an audience.

In order to prevent the audience observing the projection apparatus both side and front drapes 546 are used to screen the apparatus from the audience.

Wagering Game Machine Architectures

Figure 3:
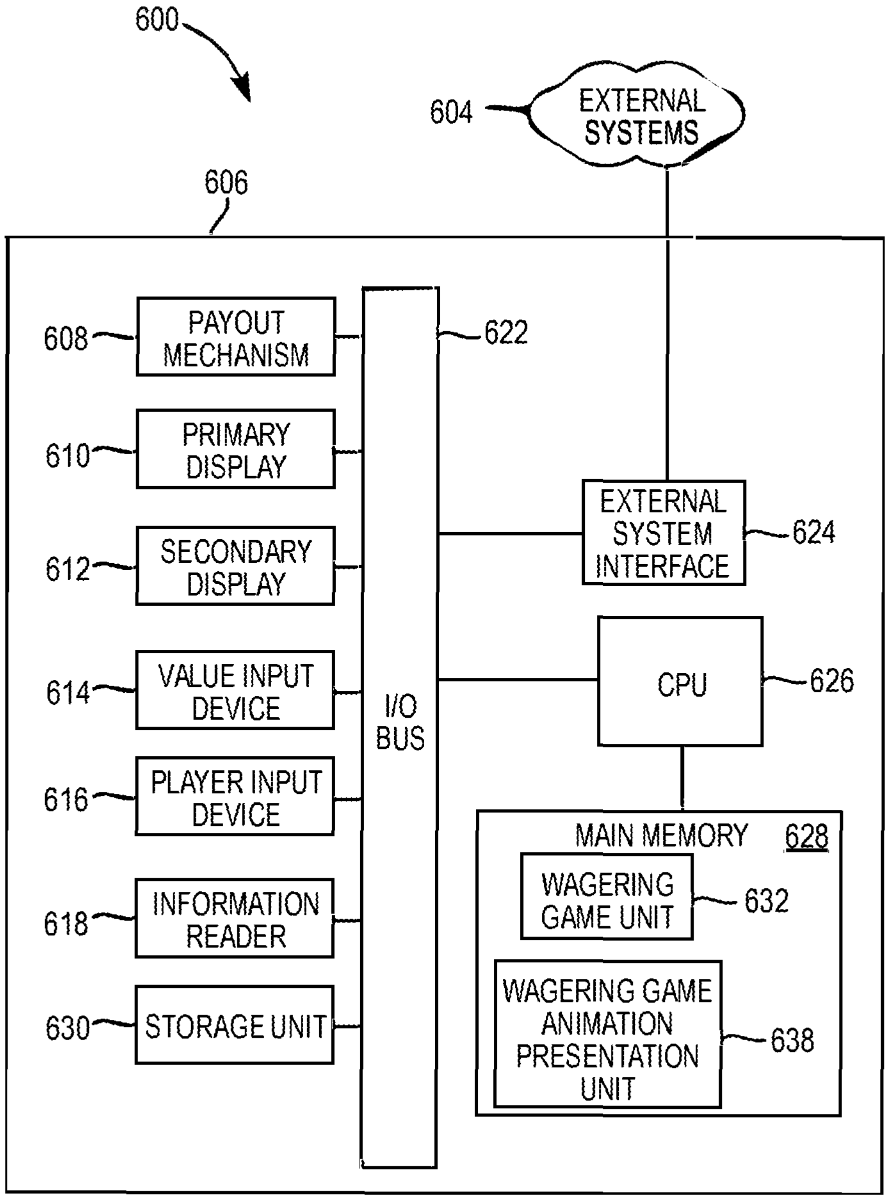
FIG. 3 is a block diagram illustrating wagering game machine architecture, according to example embodiments of the invention.

FIG. 3 is an embodiment of a block diagram illustrating Prior Art wagering game machine architecture 600, according to example embodiments of the invention. As shown in FIG. 3, the wagering game machine architecture 600 includes a wagering game machine 606, which includes a central processing unit (CPU) 626 connected to main memory 628. The CPU 626 can include any suitable processor, such as an Intel™ Pentium processor, Intel® Core 2 Duo processor, AMD Opteron® processor, or Ultra SPARC processor. The main memory 628 includes a wagering game unit 632 and a wagering game animation presentation unit 638. In one embodiment, the wagering game unit 632 can present the wagering games described herein, in whole or part.

The wagering game animation presentation unit 638 receives wagering game animations generated by a content server (e.g., the content server described above) and presents the wagering game animations on a primary display 610 and/or a secondary display 612 of the wagering game machine 600 in accordance with instructions from a content server. In some implementations, the main memory 628 may also comprise a compositing unit. The compositing unit can receive, from the content server, a template animation, a randomly generated wagering game outcome, and an orientation of an object(s) of the wagering game. The compositing unit can generate the wagering game animation and present the wagering game animation on the primary display 610 and/or the secondary display 612 of the wagering game machine 600 based on the template animation, the outcome, and the orientation of the object(s).

The CPU 626 is also connected to an input/output (I/O) bus 622, which can include any suitable bus technologies, such as an AGTL+frontside bus and a PCI backside bus. The I/O bus 622 is connected to a payout mechanism 608, the primary display 610, the secondary display 612, value input device 614, player input device 616, information reader 618, and storage unit 630. The player input device 616 can include the value input device 614 to the extent the player input device 616 is used to place wagers. The I/O bus 622 is also connected to an external system interface 624, which is connected to external systems 604 (e.g., wagering game networks).

In one embodiment, the wagering game machine 606 can include additional peripheral devices and/or more than one of each component shown in FIG. 3. For example, in one embodiment, the wagering game machine 606 can include multiple external system interfaces 624 and/or multiple CPUs 626. In one embodiment, any of the components can be integrated or subdivided.

Any component of the architecture 600 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). Machine-readable media can be machine-readable storage media or machine-readable signal media. Examples of machine-readable storage media include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Examples of machine-readable signal media can be in the form of an electro-magnetic signal, an optical signal, or any suitable combination thereof.

A graphical user interface (GUI) is a type of computer application user interface that allows people to interact with a computer and computer-controlled devices. A GUI typically employs graphical icons, visual indicators or special graphical elements, along with text, labels or text navigation to represent the information and actions available to a user. The actions are usually performed through direct manipulation of the graphical elements.

Holographic images can be created as single or consecutive images using available holographic technology. These technologies include mirrors, lasers, light and images strategically positioned to cause the proper reflection to yield a holographic image broadcast through an entry point in the laser and mirror positioning system. Black background and rooms with low or no light may enhance the appearance of the holographic image or images, which may also use a holographic plate as a display medium. Holographic systems may be large in size and spread out over a large broadcasting area or may be compact enough to fit in spaces smaller than a desk top. Holographic technology is only limited in size by the size of the component parts. By using holographic technology, images may be displayed multi-dimensionally, rather simply on a planar projection.

Currently progress has been made in technologies that can enhance the capability and range of holographic media in projects that employ multi-million mirror systems and via companies that have designed specialized high speed and high capacity micro processors for specialized jobs, other than holographic systems, where the technology could be applied to holographic technologies to make possible the proper positioning of millions of mirrors at a rate of between 24 to 60 or more frames of video per second, with corresponding synched audio.

Holographic displays generated over the last 20-year period utilize various configurations including lasers with images on glass plates such as an AGFA 8E75HD glass plate or other glass plates as well a laser such as a Spectra Physics 124B HeNe laser, a 35 mW laser diode system utilizing different processing methods such as pyrochrome processing. Split beam techniques can also be used Multi H1 to Multi H2. Such configurations as 8.times. 10,triethanolomine, from Linotronic 300 image setter film are also commonly utilized or a configuration with rear-illuminated for 30.times.40 cm reflection hologram, where a logo floats 18-inches in front of the plate.

Figure 4:
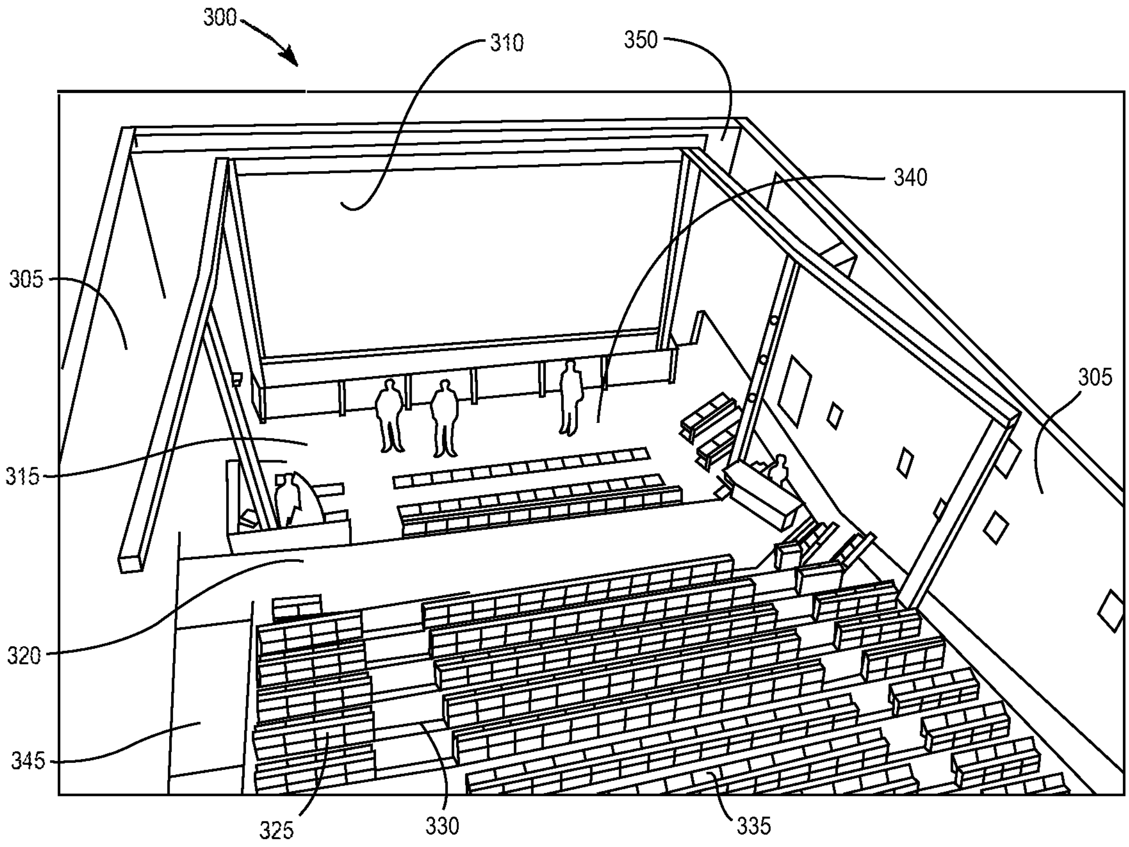
FIG. 4 is a perspective overview of an example of an enclosed theater system with seating for engaging in three-dimensional systems according to the present technology.

FIG. 4 is a perspective overview of an example of an enclosed theater system 300 with seating 325, 335 for engaging in three-dimensional systems according to the present technology. The screen 310 is positioned with walk spaces 315, 340, 320, 345 and 330 distributed about the seating 325 and 335. Walls 305 enclose the theater system 300. Space between the screen 310 and a back frame/wall system 350 can be used to store apparatus (not shown) used in creating the three-dimensional gaming images used within the scope of the present technology.

Published U.S. Patent Application Document No. 20090109175 describes a system for a 3 dimensional (3-D) user interface comprises: one or more 3-D projectors configured to display an image at a first location in a 3-D coordinate system; one or more sensors configured to sense user interaction with the image and to provide user interaction information; and a processor configured (i) to receive the user interaction information from the one or more sensors; (ii) to correlate the user interaction with the image; and (iii) to provide one or more indications responsive to a correlation of the user interaction with the image, wherein the one or more indications comprise displaying the image at a second location in the 3-D coordinate system. A method for providing a 3-D user interface comprises: generating an image at a first location in a 3-D coordinate system; sensing user interaction with the image; correlating the user interaction with the image; and providing one or more indications responsive to a correlation of the user interaction with the image, wherein the one or more indications comprise displaying the image at a second location in the 3-D coordinate system. Computer readable program codes related to the system and the method of the present invention are also described herein. This progressive display of pre-enabled holographic displays is less preferred in the practice of the present technology, but must be considered as an optional embodiment herein. In thistechnology, some user interfaces have adopted a multi-dimensional interface approach. For example, the "heliodisplay" of 102 Technology, LLC of San Francisco, Calif. projects images into a volume of free space, i.e. into an aerosol mixture such as fog or a gas, and may operate as floating touchscreen when connected to a PC by a USB cable. However, with the heliodisplay, the image is displayed into two-dimensional space (i.e. planar). While the Heliodisplay images appear 3 dimensional ("3-D"), the images are planar and have no physical depth reference. Unfortunately, these existing uses have certain limitations in distribution and deployment. For example, functionally, the heliodisplay is a two dimensional display that projects against a curtain of air, or even glass. While, the heliodisplay may give the appearance of 3-D, the images displayed and the interface are 2-D. As such, the heliodisplay is not a true 3-D holographic display, and thus the interface operates on a two-dimensional plane, not taking advantage of a full three dimensional coordinate system.

Accordingly, one would likely use an integrated user interface that utilizes true 3-D technology to create a computing and multimedia environment where a user can easily navigate by touch, mouse or pointer system to effectively navigate the interface to raise the level of the user experience to a true 3-D environment, with the goal of attaining elements of the attenuated clarity, realism and benefits of that environment that match our day to day conventional interactions with the 3-D world. The present invention relates to the creation of a holographic user interface display system that combines physical media or digitally stored files with a digital holographic player hardware system. The result is the creation of a multimedia holographic user interface and viewing experience, where a variety of graphical schematics enabling cohesive access to information utilizing pyramids, blocks, spheres, cylinders, other graphical representations, existing templates, specific object rendering, free form association, user delegated images and quantum representations of information to form a user interface where the available tools combine over time to match a user's evolving data and requests.

What is claimed:

1. A gaming system, comprising:

a plurality of player terminals, each player terminal including a seat, a first display, a player input system enabling a player to communicate with the player terminal, and an electro-mechanical component configured to provide a first gaming event unique to each player terminal on the first display, wherein the first gaming event involves a first wager from each player terminal necessary to participate in the first gaming event, a first random event outcome determining the first gaming event displayed on the first display, and the first wager being resolved based on the first random event outcome; and a communal gaming system within a facility including the plurality of player terminals with a network connecting the communal gaming system to the at least two player terminals, the communal gaming system including a processor and memory for storing first code that configures the processor to simulate a second gaming event common to each player terminal, and a second three-dimensional video display physically separated from the first display and viewable by each player of the plurality of player terminals within an at least 30 degree field of view, wherein each player terminal of the plurality of player terminals is positioned within the at least 30 degree field of view, and wherein the first code further configures the processor to receive second wagers from one or more of the plurality of player terminals necessary to participate in the second gaming event, to generate a second random event outcome for the second gaming event, to display three-dimensional animation data on the second display corresponding to the second random event outcome, and to resolve the second wagers based on the second random event outcome on each player terminal while each player terminal carries out the first gaming event during or between each second gaming event.

2. The gaming system of claim 1, wherein the communal gaming system further includes second code stored in the memory that configures the processor to carry out the first gaming event on each player terminal over the network based on the first random event outcome.

3. The gaming system of claim 2, wherein the memory is non-volatile, and wherein the communal gaming system is a state machine configured to store data associated with the first gaming event and the second gaming event in the memory in a manner that enables play of the first gaming event and the second gaming event to resume at a point where either the first gaming event or the second gaming event was disrupted.

4. The gaming system of claim 1, wherein each player terminal includes a terminal processor and second memory storing second code that configures the terminal processor to carry out the first gaming event on each player terminal based on the first random event outcome.

5. The gaming system of claim 4, wherein the second memory is non-volatile, and wherein each player terminal is a state machine configured to store data associated with the first gaming event in the memory in a manner that enables play of the first gaming event to resume at a point where the first gaming event was disrupted.

6. The gaming system of claim 5, wherein the memory is non-volatile, and wherein the communal gaming system is a state machine configured to store data associated with the second gaming event in the memory in a manner that enables play of the second gaming event to resume at a point where the second gaming event was disrupted.

7. The gaming system of claim 1, wherein the first gaming event is unrelated to the second gaming event.

8. The gaming system of claim 1, wherein the player terminal includes a housing, wherein the electro-mechanical component is positioned on a top of the housing, and wherein the electro-mechanical component includes one or more of: a spinning roulette wheel with a revolving ball, bouncing dice, a spinning candy wheel, cards being dealt face up or down, and physically moving tiles, each covered and enclosed by a transparent or translucent covering or closing element.

9. A method of carrying out gaming events, comprising:

carrying out a first gaming event at each player terminal among a plurality of player terminals, each player terminal including a seat, a first display, a player input system enabling a player to communicate with the player terminal, and an electro-mechanical component configured to provide the first gaming event on the first display, each first gaming event unique to each player terminal, wherein the first gaming event involves a first wager from each player terminal necessary to participate in the first gaming event, a first random event outcome determining the first gaming event displayed on the first display, and the first wager being resolved based on the first random event outcome;

carrying out a second gaming event through a communal gaming system within a facility including the plurality of player terminals with a network connecting the communal gaming system to the at least two player terminals, the communal gaming system including a processor and memory for storing first code that configures the processor to simulate a second gaming event common to each player terminal, and a second three-dimensional video display physically separated from the first display and viewable by each player of the plurality of player terminals within an at least 30 degree field of view, wherein each player terminal of the plurality of player terminals is positioned within the at least 30 degree field of view, and wherein the first code further configures the processor to receive second wagers from one or more of the player terminals necessary to participate in the second gaming event, to generate a second random event outcome for the second gaming event, to display three-dimensional animation data on the second display corresponding to the second random event outcome, and to resolve the second wagers based on the second random event outcome on each player terminal; and carrying out each first gaming event during or between each second gaming event.

10. The method of claim 9, wherein the processor carries out the first gaming event on each player terminal over the network based on the first random event outcome.

11. The method of claim 10, wherein the communal gaming system is a state machine capable of resuming operation at a point where either the first gaming event or the second gaming event was disrupted without loss of player data or first gaming event or second gaming event status.

12. The method of claim 9, wherein each player terminal includes a terminal processor that carries out the first gaming event on each player terminal based on the first random event outcome.

13. The method of claim 12, wherein each player terminal is a state machine capable of resuming operation at a point where the first gaming event was disrupted without loss of player data or first gaming event status.

14. The method of claim 13, wherein the communal gaming system is a state machine capable of resuming operation at a point where the second gaming event was disrupted.

15. The method of claim 9, wherein the first gaming event is unrelated to the second gaming event.

16. The method of claim 9, wherein the electro-mechanical component operates one or more of: a spinning roulette wheel with a revolving ball, bouncing dice, a spinning candy wheel, cards being dealt face up or down, and physically moving tiles, each covered and enclosed by a transparent or translucent covering or closing element.

* * * * *